US012560581B2

(12) United States Patent
    Cardin

(10) Patent No.:     US 12,560,581 B2
(45) Date of Patent:         Feb. 24, 2026

(54) SYSTEM AND METHOD OF MATRIX ACCELERATED VACUUM-ASSISTED SORBENT EXTRACTION FOR IMPROVED SAMPLE PREPARATION PRIOR TO GCMS ANALYSIS

(71) Applicant: Entech Instruments Inc., Simi Valley, CA (US)

(72) Inventor: Daniel B. Cardin, Simi Valley, CA (US)

(73) Assignee: Entech Instruments Inc., Simi Valley, CA (US)

( * ) Notice: Subject to any disclaimer, the term of this patent is extended or adjusted under 35 U.S.C. 154(b) by 0 days.

(21) Appl. No.: 17/399,469

(22) Filed: Aug. 11, 2021

(65) Prior Publication Data

US 2022/0050085 A1     Feb. 17, 2022

Related U.S. Application Data

(60) Provisional application No. 63/064,334, filed on Aug. 11, 2020.

(51) Int. Cl.
  *G01N 1/40*          (2006.01)
  *G01N 30/12*         (2006.01)
        (Continued)

(52) U.S. Cl.
  CPC ............. *G01N 30/12* (2013.01); *G01N 1/405* (2013.01); *G01N 30/7206* (2013.01);
        (Continued)

(58) Field of Classification Search
  CPC .. G01N 30/12; G01N 1/405; G01N 2030/025; G01N 2001/4033;
        (Continued)

(56) References Cited

U.S. PATENT DOCUMENTS 2,985,007 A      5/1961   Jan
3,043,127 A      7/1962   De et al.
        (Continued)

FOREIGN PATENT DOCUMENTS

CN        2789754 Y      6/2006
CN      101793880 A      8/2010
        (Continued)

OTHER PUBLICATIONS

Ho et al. ("Influences of relative humidities and temperatures on the collection of C2—C5 aliphatic hydrocarbons with multi-bed (Tenax TA, Carbograph 1TD, Carboxen 1003) sorbent tube method," Atmospheric Environment vol. 151, Feb. 2017, pp. 45-51) (Year: 2017).*

(Continued)

*Primary Examiner* — Jill A Warden
*Assistant Examiner* — Michael Stanley Gzybowski
(74) *Attorney, Agent, or Firm* — Kubota & Basol LLP

(57)            ABSTRACT

Techniques disclosed herein can improve the extraction of chemicals prior to analysis by GC or GCMS. A liquid or solid sample can be placed in a sample container of a closed system under vacuum that further includes a sample extraction device. The assembly can be placed in a 3-zone heater that can separately control the temperature of the bottom of the sample container, the top of the sample container, and the sample extraction device. Vapor flux from the bottom of the sample container into the headspace of the sample container can deliver compounds of interest to the sample extraction device, whereas matrix compounds can re-condense in the headspace of the sample container to avoid delivery to the sample extraction device. Extraction can continue until substantial transfer of compounds of interest to the sorbent occurs, followed by thermal desorption of the extract into a GCMS for analysis.

14 Claims, 3 Drawing Sheets

(51) Int. Cl.
    *G01N 30/72*      (2006.01)
    *H01J 49/00*      (2006.01)
    *H01J 49/04*      (2006.01)
    *G01N 30/02*      (2006.01)

(52) U.S. Cl.
    CPC ........ *H01J 49/004* (2013.01); *H01J 49/0422* (2013.01); *H01J 49/0495* (2013.01); *G01N 2030/025* (2013.01)

(58) Field of Classification Search
    CPC ....... G01N 2030/009; G01N 2030/062; G01N 1/44; G01N 30/7206; G01N 30/14; G01N 2030/126; G01N 30/06; G01N 2030/121; H01J 49/0422; H01J 49/0495; H01J 49/043
    See application file for complete search history.

(56)                References Cited

U.S. PATENT DOCUMENTS

| | | | |
|---|---|---|---|
| 4,170,901 | A | 10/1979 | Conkle et al. |
| 4,213,326 | A | 7/1980 | Brodasky |
| 4,249,904 | A | 2/1981 | Reisch et al. |
| 4,300,393 | A | 11/1981 | Stearns |
| 4,583,394 | A | 4/1986 | Murakami et al. |
| 4,805,441 | A | 2/1989 | Sides et al. |
| 4,849,179 | A | 7/1989 | Reinhardt et al. |
| 5,081,871 | A | 1/1992 | Glaser |
| 5,089,124 | A | 2/1992 | Mahar et al. |
| 5,198,197 | A | 3/1993 | Clay et al. |
| 5,250,093 | A * | 10/1993 | Jiang ............... G01N 33/241 422/89 |
| 5,288,310 | A | 2/1994 | Peters et al. |
| 5,347,844 | A | 9/1994 | Grob et al. |
| 5,363,707 | A | 11/1994 | Augenblick et al. |
| 5,465,607 | A | 11/1995 | Corrigan et al. |
| 5,496,741 | A | 3/1996 | Pawliszyn |
| 5,711,786 | A | 1/1998 | Hinshaw |
| 5,792,423 | A | 8/1998 | Markelov |
| 5,847,291 | A | 12/1998 | Green et al. |
| 5,866,004 | A | 2/1999 | Houck et al. |
| 5,900,532 | A | 5/1999 | Ikeda et al. |
| 5,952,557 | A | 9/1999 | Ikeda et al. |
| 6,177,008 | B1 | 1/2001 | Treiber et al. |
| 6,186,012 | B1 | 2/2001 | Kenny et al. |
| 6,351,983 | B1 | 3/2002 | Haas et al. |
| 6,395,560 | B1 | 5/2002 | Markelov |
| 6,484,560 | B1 | 11/2002 | Prest |
| 6,649,403 | B1 | 11/2003 | Mcdevitt et al. |
| 6,662,626 | B2 | 12/2003 | Van |
| 6,677,129 | B1 | 1/2004 | Blume |
| 6,708,550 | B2 | 3/2004 | Mcgee et al. |
| 6,726,637 | B2 | 4/2004 | Phillips |
| 6,770,246 | B1 | 8/2004 | Husek |
| 6,814,785 | B2 | 11/2004 | Tipler et al. |
| 7,329,393 | B2 | 2/2008 | Backes et al. |
| 7,464,614 | B2 | 12/2008 | Harvey |
| 7,568,401 | B1 | 8/2009 | Berends, Jr. |
| 7,674,631 | B2 | 3/2010 | Pawliszyn |
| 7,700,045 | B2 | 4/2010 | Skarping et al. |
| 7,776,615 | B2 | 8/2010 | Yuka et al. |
| 8,182,768 | B2 | 5/2012 | Tipler et al. |
| 8,342,042 | B2 | 1/2013 | Scott et al. |
| 8,347,688 | B2 | 1/2013 | O'brien |
| 8,388,736 | B2 | 3/2013 | Marotta et al. |
| 8,404,185 | B2 | 3/2013 | Tipler et al. |
| 8,465,700 | B2 | 6/2013 | Huang |
| 8,561,484 | B2 | 10/2013 | Tipler et al. |
| 9,329,066 | B2 | 5/2016 | Skarping et al. |
| 9,404,900 | B2 | 8/2016 | Herman et al. |
| 9,733,225 | B2 | 8/2017 | Armstrong |
| 9,918,661 | B2 | 3/2018 | Cormier et al. |
| 10,502,664 | B2 | 12/2019 | Cardin |
| 10,835,155 | B2 | 11/2020 | Phillips |
| 10,849,600 | B2 | 12/2020 | Cardin |
| 10,866,166 | B2 | 12/2020 | Shaikh et al. |
| 2002/0020209 | A1 | 2/2002 | Grob et al. |
| 2002/0144949 | A1 | 10/2002 | Berger et al. |
| 2003/0190757 | A1 | 10/2003 | Furuno et al. |
| 2004/0072375 | A1 | 4/2004 | Gjerde et al. |
| 2005/0014156 | A1 | 1/2005 | Pawliszyn |
| 2005/0019950 | A1 | 1/2005 | Gierde et al. |
| 2005/0059162 | A1 | 3/2005 | Wohleb |
| 2005/0233085 | A1 | 10/2005 | Miller et al. |
| 2006/0073538 | A1 | 4/2006 | Konrad |
| 2006/0137432 | A1 | 6/2006 | Kin et al. |
| 2006/0286606 | A1 | 12/2006 | Oliver |
| 2007/0193871 | A1 | 8/2007 | Wiseman et al. |
| 2007/0284523 | A1 | 12/2007 | May et al. |
| 2008/0009761 | A1 | 1/2008 | Acker et al. |
| 2008/0064115 | A1 | 3/2008 | Hiramatsu et al. |
| 2008/0179252 | A1 | 7/2008 | Sasano et al. |
| 2009/0038374 | A1 | 2/2009 | Broz |
| 2009/0317916 | A1 | 12/2009 | Ewing et al. |
| 2010/0242579 | A1 | 9/2010 | Tipler et al. |
| 2011/0033949 | A1 | 2/2011 | Eum |
| 2011/0079143 | A1 | 4/2011 | Marotta et al. |
| 2011/0082380 | A1 | 4/2011 | Breen |
| 2011/0277563 | A1 | 11/2011 | Scott et al. |
| 2012/0160038 | A1 | 6/2012 | Wells et al. |
| 2012/0310113 | A1 | 12/2012 | Giddings et al. |
| 2013/0017545 | A1 | 1/2013 | Yong et al. |
| 2014/0060331 | A1 | 3/2014 | Peene et al. |
| 2014/0329705 | A1 | 11/2014 | Wong et al. |
| 2014/0345365 | A1 | 11/2014 | Aono et al. |
| 2015/0005657 | A1 | 1/2015 | Nijsen et al. |
| 2015/0075300 | A1 | 3/2015 | Hankemeier et al. |
| 2015/0276780 | A1 | 10/2015 | Bremer et al. |
| 2015/0364310 | A1 | 12/2015 | Musselman |
| 2016/0189945 | A1 | 6/2016 | Zhang et al. |
| 2017/0003205 | A1 | 1/2017 | Kabir et al. |
| 2017/0030892 | A1 | 2/2017 | Fu et al. |
| 2017/0261408 | A1 | 9/2017 | Cardin |
| 2017/0284978 | A1 | 10/2017 | Cardin |
| 2017/0303900 | A1 | 10/2017 | Cardin |
| 2018/0246071 | A1 | 8/2018 | Cardin |
| 2018/0372599 | A1* | 12/2018 | Cardin ................ G01N 1/34 |
| 2019/0231222 | A1 | 8/2019 | Ahmad et al. |
| 2019/0274588 | A1 | 9/2019 | Cardin |
| 2019/0329174 | A1 | 10/2019 | Khiavi |
| 2020/0033236 | A1 | 1/2020 | Shaikh et al. |
| 2020/0041469 | A1 | 2/2020 | Cardin |
| 2020/0191686 | A1 | 6/2020 | Cardin |
| 2020/0305849 | A1 | 10/2020 | Mamerow et al. |
| 2020/0378928 | A1 | 12/2020 | Cardin |
| 2021/0396629 | A1 | 12/2021 | Cognon et al. |
| 2022/0381766 | A1 | 12/2022 | Cardin |
| 2023/0168163 | A1 | 6/2023 | Cardin |
| 2024/0264048 | A1 | 8/2024 | Cardin |

FOREIGN PATENT DOCUMENTS

| | | | |
|---|---|---|---|
| CN | 202748263 U | 2/2013 | |
| CN | 202748340 U | 2/2013 | |
| CN | 203324233 U | 12/2013 | |
| CN | 104133031 A | 11/2014 | |
| CN | 104458970 A | 3/2015 | |
| CN | 104698064 A | 6/2015 | |
| CN | 105251238 A | 1/2016 | |
| CN | 105510090 A | 4/2016 | |
| CN | 105866272 A | 8/2016 | |
| CN | 106124255 A | 11/2016 | |
| CN | 107085046 A | 8/2017 | |
| CN | 108693261 A | 10/2018 | |
| CN | 109406231 A | 3/2019 | |
| EP | 0572968 A2 | 12/1993 | |
| EP | 0915329 A2 | 5/1999 | |
| EP | 1139087 A2 | 10/2001 | |
| EP | 2158469 A2 | 3/2010 | |
| EP | 2469261 A1 | 6/2012 | |
| EP | 2485035 A2 | 8/2012 | |
| EP | 3040721 A1 | 7/2016 | |
| GB | 2250633 A | 6/1992 | |

(56) References Cited

FOREIGN PATENT DOCUMENTS

| | | |
|---|---|---|
| JP | S57-24543 U | 2/1982 |
| JP | H05-126699 A | 5/1993 |
| JP | H05-506715 A | 9/1993 |
| JP | H08-160024 A | 6/1996 |
| JP | H10-185890 A | 7/1998 |
| JP | 2000-2695 A | 1/2000 |
| JP | 2002-236079 A | 8/2002 |
| JP | 2002-328078 A | 11/2002 |
| JP | 2004-53268 A | 2/2004 |
| JP | 2004-93496 A | 3/2004 |
| JP | 2005-510708 A | 4/2005 |
| JP | 2005-338081 A | 12/2005 |
| JP | 2007-514149 A | 5/2007 |
| JP | 2008-111730 A | 5/2008 |
| JP | 2010-96665 A | 4/2010 |
| JP | 2015-197444 A | 11/2015 |
| JP | 2016-126013 A | 7/2016 |
| JP | 2018-154130 A | 10/2018 |
| JP | 2019-508718 A | 3/2019 |
| KR | 10-2004-0012068 A | 2/2004 |
| RU | 2085907 C1 | 7/1997 |
| RU | 34739 U1 | 12/2003 |
| SU | 817583 A1 | 3/1981 |
| WO | 1991/015745 A1 | 10/1991 |
| WO | 1994/028409 A2 | 12/1994 |
| WO | 2002/086488 A1 | 10/2002 |
| WO | 2005/057206 A1 | 6/2005 |
| WO | 2008/020416 A2 | 2/2008 |
| WO | 2008/157074 A2 | 12/2008 |
| WO | 2008/157074 A3 | 1/2010 |
| WO | 2011/031559 A1 | 3/2011 |
| WO | 2011/143349 A1 | 11/2011 |
| WO | 2016/107515 A1 | 7/2016 |
| WO | 2017/156005 A1 | 9/2017 |
| WO | 2018/013946 A1 | 1/2018 |
| WO | 2018/160757 A1 | 9/2018 |
| WO | 2021/003316 A1 | 1/2021 |

OTHER PUBLICATIONS

Advisory Action received for U.S. Appl. No. 16/526,838, mailed on Mar. 15, 2023, 2 pages.

Corrected Notice of Allowance received for U.S. Appl. No. 15/450,236, mailed on Nov. 13, 2019, 2 pages.

Final Office Action received for U.S. Appl. No. 15/649,480, mailed on Mar. 24, 2020, 9 pages.

Final Office Action received for U.S. Appl. No. 16/526,838, mailed on Aug. 31, 2023, 10 pages.

Final Office Action received for U.S. Appl. No. 16/526,838, mailed on Dec. 19, 2022, 9 pages.

International Search Report received for PCT Application No. PCT/US2021/045578, mailed on Nov. 22, 2021, 4 pages.

International Search Report received for PCT Application No. PCT/US2022/080593, mailed on Feb. 28, 2023, 5 pages.

International Search Report received for PCT Patent Application No. PCT/US2017/021167, mailed on Jun. 1, 2017, 5 pages.

International Search Report received for PCT Patent Application No. PCT/US2017/042172, mailed on Sep. 14, 2017, 4 pages.

International Search Report received for PCT Patent Application No. PCT/US2018/020313, mailed on May 28, 2018, 4 pages.

International Search Report received for PCT Patent Application No. PCT/US2019/020995, mailed on Jun. 11, 2019, 4 pages.

International Search Report received for PCT Patent Application No. PCT/US2019/044252, mailed on Nov. 11, 2019, 4 pages.

International Search Report received for PCT Patent Application No. PCT/US2022/072637, mailed on Nov. 3, 2022, 7 pages.

Non-Final Office Action received for U.S. Appl. No. 15/450,236, mailed on Feb. 7, 2019, 16 pages.

Non-Final Office Action received for U.S. Appl. No. 15/649,480, mailed on Aug. 21, 2019, 18 pages.

Non-Final Office Action received for U.S. Appl. No. 15/908,491, mailed on Mar. 23, 2020, 12 pages.

Non-Final Office Action received for U.S. Appl. No. 16/294,325, mailed on Mar. 29, 2023, 12 pages.

Non-Final Office Action received for U.S. Appl. No. 16/526,838, mailed on Jun. 13, 2022, 10 Pages.

Non-Final Office Action received for U.S. Appl. No. 16/526,838, mailed on May 25, 2023, 9 pages.

Non-Final Office Action received for U.S. Appl. No. 16/706,603, mailed on Aug. 18, 2022, 15 pages.

Non-Final Office Action received for U.S. Appl. No. 15/908,491, mailed on Dec. 4, 2020, 7 pages.

Notice of Allowance received for U.S. Appl. No. 15/450,236, mailed on Jun. 20, 2019, 8 pages.

Notice of Allowance received for U.S. Appl. No. 15/649,480, mailed on Jul. 24, 2020, 11 pages.

Notice of Allowance received for U.S. Appl. No. 16/294,325, mailed on Oct. 13, 2023, 8 Pages.

Restriction Requirement received for U.S. Appl. No. 15/908,491, mailed on Nov. 19, 2019, 7 pages.

Restriction Requirement received for U.S. Appl. No. 16/526,838, mailed on Mar. 9, 2022, 6 pages.

Search Report received for Chinese Patent Application No. 201780026386.5, mailed on Feb. 3, 2021, 4 pages (2 page of English Translation and 2 pages of Official Copy).

Search Report Received for Chinese Patent Application No. 201980051020.2 mailed on May 7, 2022, 8 Pages (4 Pages of English Translation and 4 Pages of Official Copy).

Anonymous, "Merlin MicroSeal Septumless GC Inlet Systems", Available online at: <https://www.hrgc.eu/merlin_microseal_introduction.htm>, retrieved on Oct. 31, 2019, 2014, pp. 1-4.

Dyne et al., "A Novel Device for Capturing Breath Samples for Solvent Analysis", Science of the Total Environment, vol. 199, No. 1-2, Jun. 1, 1997, pp. 83-89.

Entech Instruments, "Air Monitoring Sorbent Pens for Environment and IH Applications", Available online at: <https://www.chimicacentro.itcataloghiEntech.Sorbent.Pens.pdf>, retrieved on Oct. 31, 2019, Dec. 31, 2017, pp. 1-15.

Hermann et al., "CGC Using a Programmable Electronic Pressure Controller", Journal of High Resolution Chromatography, vol. 13, No. 5, May 1990, pp. 361-365.

Pocurull et al., "Introduction of Large Volumes of Water-containing Samples Into a Gas Chromatograph", Journal of Chromatography A, vol. 876, No. 1-2, Apr. 21, 2000, pp. 135-145.

Schubert et al., "CO2-controlled Sampling of Alveolar Gas in Mechanically Ventilated Patients", J. Appl Physiol, vol. 90, No. 2, Available online at: <https://doi.org/10.1152/jappl.2001.90.2.486>, Feb. 1, 2001, pp. 486-492.

Thomas et al., "A Canister-Based Method for Collection and GC/MS Analysis of Volatile Organic Compounds in Human Breath", Journal of Analytical Toxicology, vol. 15, No. 2, March/Apr. 1991, pp. 54-59.

Non-Final Office Action received for U.S. Appl. No. 16/526,838, mailed on Apr. 9, 2024, 6 pages.

Corrected Notice of Allowability received for U.S. Appl. No. 16/526,838, mailed on Nov. 6, 2024, 5 pages.

Notice of Allowance received for U.S. Appl. No. 16/526,838, mailed on Aug. 29, 2024, 8 pages.

Restriction Requirement received for U.S. Appl. No. 17/804,557, mailed on Nov. 27, 2024, 5 pages.

Non-Final Office Action received for U.S. Appl. No. 17/804,557, mailed on Mar. 25, 2025, 21 pages.

* cited by examiner

200

202
Connect sample container, sample extraction device, and vacuum sleeve

204
Draw vacuum

206
Control temperature of multiple zones of system

208
Collect one or more compounds of sample

210
Dehydrate sample collection device

212
Conduct chemical analysis

1

SYSTEM AND METHOD OF MATRIX ACCELERATED VACUUM-ASSISTED SORBENT EXTRACTION FOR IMPROVED SAMPLE PREPARATION PRIOR TO GCMS ANALYSIS

CROSS-REFERENCE TO RELATED APPLICATION

This application claims the benefit of U.S. Provisional Patent Application No. 63/064,334, filed on Aug. 11, 2020, the entire disclosure of which is incorporated herein by reference in its entirety for all purposes.

FIELD OF THE DISCLOSURE

The disclosure relates to sample preparation and, more particularly, a system and method for preparing a sample via diffusive vacuum extraction.

BACKGROUND OF THE DISCLOSURE

Gas Chromatography/Mass Spectrometry (GCMS) has become a widely used technique for measuring chemicals with boiling points ranging from −253° C. (e.g., Hydrogen) to over 600° C. (e.g., 6-8 ring PAHs). For compounds to be compatible with GCMS, they must have a reasonably high vapor pressure within the operating constraints of this technique (typically −50 C to 400 C), while being thermally stable enough to pass through the GC column to the detector in the gas phase, for example. Prior to GCMS injection, samples can be cleaned up so that only GC compatible compounds are introduced into the GC. In some situations, non-GC compatible compounds can deposit at the inlet to the GC column or on the column itself, resulting in adsorption or reaction (abundance reduction) for many compounds thereby affecting the accuracy of their measurements. Some compounds can thermally decompose into all new compounds, creating what are called artifacts that can lead the analyst to believe that these artifacts were actually contained within the sample, when in fact they were not.

In addition, GCMS systems can be sensitive to the injection of too much water, as excess water can damage the GC column, create interactions with co-injected target compounds, and cause suppression of the signal in the mass spectrometer. Even a small amount of water (e.g., 0.1-0.2 ul) can change the vacuum within the mass spectrometer, resulting in decreased ionization efficiency, or increased gas phase collisions which reduce ion transfer efficiency to the electron multiplier or other ion detector.

Several techniques can extract the GCMS-compatible compounds from a large variety of matrices (water, beverages, blood, urine, food, consumer products, etc.), but these techniques can have limitations that prevent them from achieving the ultimate goals of recovering GC compatible compounds, rejecting non-GC compatible compounds, and reducing or minimizing the inclusion of the volatile sample matrix into the extract (e.g., moisture, alcohol). Several extraction techniques use the headspace above a liquid or solid sample to perform the extraction process because the headspace only contains compounds that are volatile or at least semi-volatile, thereby eliminating the non-volatile components of the sample from the extraction. Other techniques that require contact with the sample can be less effective at excluding non-volatile compounds from the extract, and will therefore not be discussed further. Those direct contact techniques include solvent extraction (liquid/liquid, Soxhlet, etc), full immersion SPME, Stir Bar Sorptive Extraction (SBSE), Hi-Sorb, Solid Phase Extraction, and others.

The goals of sample extraction techniques can include:
increasing sensitivity
increasing precision
reducing interferences
reducing artifact formation
reducing analysis times
increasing the boiling point range of compounds (to at least include full target list)
improving recovery of both polar and non-polar GC compatible compounds
improving the recovery of thermally labile compounds
ability to handle liquid and solid samples, or a mixture of each
providing multi-sample automation
reducing carryover
maintaining analyzer cleanliness
eliminating the use of dangerous solvents Below are the many static and dynamic headspace techniques that have been either used or proposed for GCMS sample preparation, and their primary disadvantages relating to the list above:

Purge & Trap (1976)—Limited to volatile compound boiling under 220° C. Subject to contamination, carryover, and matrix interferences. Long pathways to the trap and analyzer.

Vacuum Distillation (US EPA, 1990)—Requires liquid nitrogen (costly, difficult to use), has poor water vapor elimination, limited to compounds boiling under 250° C., and challenging to automate. No commercial systems were ever created.

SPME (1990)—Limited phase on fiber causes matrix interferences, high carryover (1-10%) into next analysis, limited to compounds boiling under 300° C.

SPME ARROW (2015)—10× more phase than SPME, but carryover issue still existed, with poor recovery of heavier compounds. Poor boiling point range.

VASE (2016)—Vacuum assisted sorbent extraction. Poor moisture rejection, causing inconsistency in the analysis, long extraction times, reduced vacuum as extraction temperatures increase PECE (2018)—Moisture condensation on the sorbent trap creates "hot rinse" that causes removal of many compounds from sorbent back into the original sample matrix.

FEVE (2019)—Full Evaporative Vacuum Extraction. Does not create a closed system, so many compounds boiling under 100° C. are not retained. Not intended for samples with non-dissolved solids.

SUMMARY OF THE DISCLOSURE

The disclosure relates to sample preparation and, more particularly, a system and method for preparing a sample via diffusive vacuum extraction. Techniques disclosed herein can remove non-volatile compounds from a sample, effectively recover target compounds of interest, and eliminate as much moisture as possible prior to GCMS injection, including additional rejection of moisture from the sample extraction device after extraction is complete.

Matrix-Accelerated Vacuum-Assisted Sorbent Extraction (MA-VASE) techniques are disclosed herein. In some embodiments, a sample vial containing a (e.g., liquid and/or solid sample) can be coupled to a sample extraction device including one or more sorbents by a vacuum sleeve. A vacuum can be drawn in the system and the temperatures of three zones—zone A at the bottom of the sample vial, zone B in the headspace of the sample vial, and zone C at the sorbent of the sorbent extraction device—can be independently controlled. For example, zone B can be the coolest and zone A can be the warmest. In some embodiments, in this configuration, one or more volatile and/or semi-volatile compounds of the sample can be transferred to the sorbent in a diffusive process under vacuum. In some embodiments, the liquid matrix of the sample does not make contact with the sorbent during the sampling process, as the sample is not drawn through the sorbent, but is instead collected diffusively as gas and vapor phase compounds reach the sorbent upon evaporating in zone A.

Techniques disclosed herein can improve extraction efficiency and matrix removal when performing sample preparation prior to GCMS analysis. Some embodiments of the disclosure use the volatile matrix to assist in the transfer of chemicals of interest from the sample to a sample extraction device 110. Multiple temperature zones during extraction can create and then eliminate a vapor flux in a closed system which can accelerate the transfer of chemicals to the sample collection device, while leaving behind the non-volatile compounds. Non-volatile chemicals can be eliminated more effectively than when using solvent extraction or when exposing an enrichment device directly to the sample matrix. Effective elimination of the non-volatile chemicals from the sample can help keep the GCMS analyzer clean so that the number of sample analyses can be maximized prior to analyzer maintenance. After the extraction of the volatile and semi-volatile compounds onto a sorbent included in the sample extraction device, the sorbent can either be solvent extracted for liquid injection into a GCMS or LCMS, or the sorbent can be thermally desorbed directly into the GCMS analyzer to improve the sensitivity of the analysis, for example. This improved sample extraction technique can be automated to allow hundreds of samples to be analyzed unattended in a laboratory.

MA-VASE described herein has advantages over the techniques described above, including for the preparation of samples including compounds boiling from −50° C. to about 550° C. The US EPA VOC methods for drinking and waste water analysis typically cover a boiling point range of about −25° C. to 220° C., so MA-VASE is an improvement on the current non-solvent based EPA methods, specifically for higher boiling point compounds There are currently over 600 compounds on the EPA's "Emerging Pollutants List", and many researchers are working on developing analytical methods for those compounds that are not amenable to extraction methods found in current EPA methods. MA-VASE has the potential to provide a superior sample preparation solution for a larger range of compounds than possible with any other technique.

DETAILED DESCRIPTION

Figure 1A:
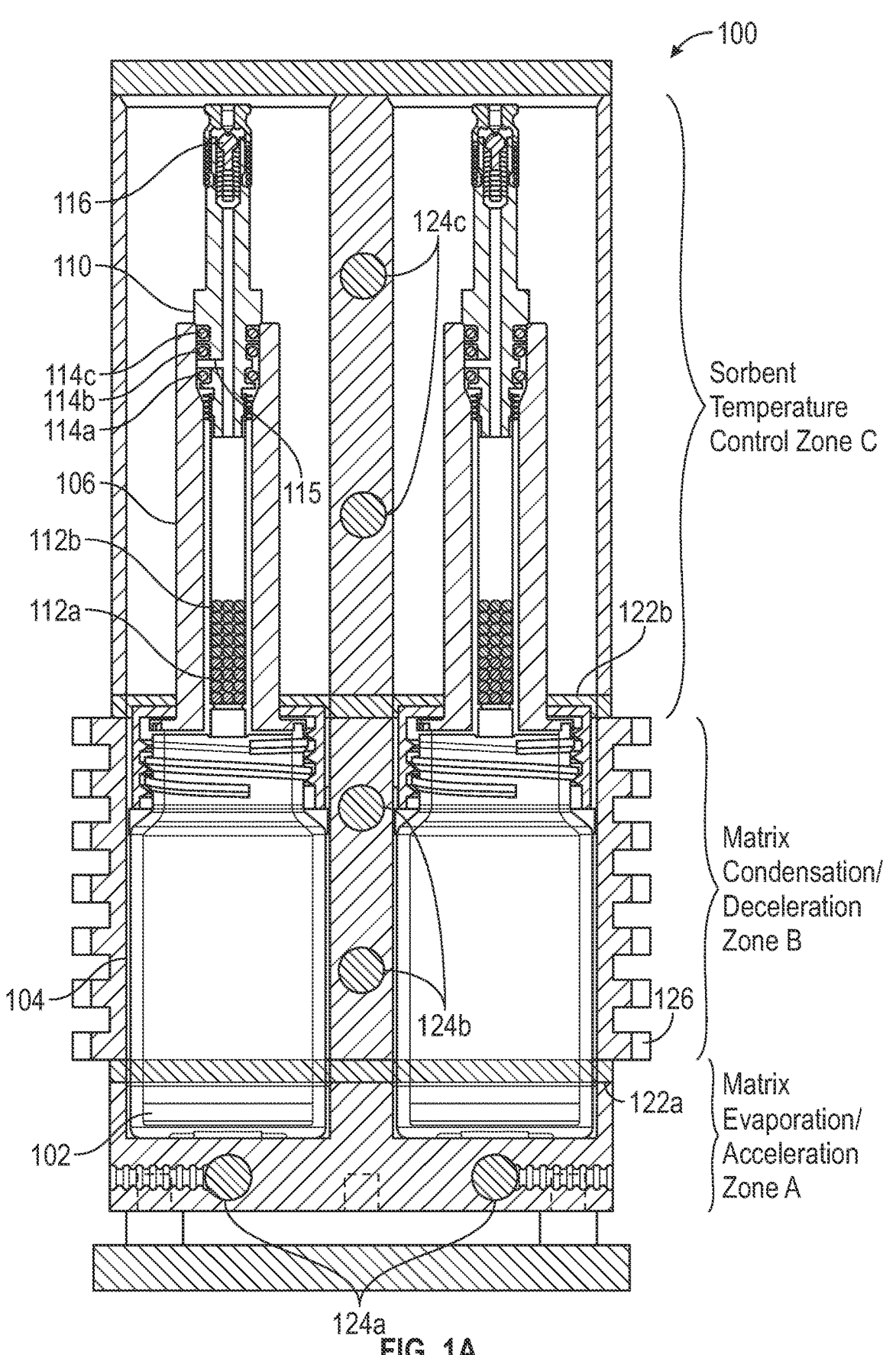
FIGS. 1A-1B illustrate exemplary sample extraction systems according to some embodiments.

In the following description, reference is made to the accompanying drawings which form a part hereof, and in which it is shown by way of illustration specific examples that can be practiced. It is to be understood that other examples can be used, and structural changes can be made without departing from the scope of the examples of the disclosure.

The disclosure relates to sample preparation and, more particularly, a system and method for preparing a sample via diffusive vacuum extraction. Techniques disclosed herein can remove non-volatile compounds from a sample, effectively recover target compounds of interest, and eliminate as much moisture as possible prior to GCMS injection, including additional rejection of moisture from the sample extraction device after extraction is complete.

Matrix-Accelerated Vacuum-Assisted Sorbent Extraction (MA-VASE) techniques are disclosed herein. In some embodiments, a sample vial containing a (e.g., liquid and/or solid sample) can be coupled to a sample extraction device including one or more sorbents by a vacuum sleeve. A vacuum can be drawn in the system and the temperatures of three zones—zone A at the bottom of the sample vial, zone B in the headspace of the sample vial, and zone C at the sorbent of the sorbent extraction device—can be independently controlled. For example, zone B can be the coolest and zone A can be the warmest. In some embodiments, in this configuration, one or more volatile and/or semi-volatile compounds of the sample can be transferred to the sorbent in a diffusive process under vacuum. In some embodiments, the liquid matrix of the sample does not make contact with the sorbent during the sampling process, as the sample is not drawn through the sorbent, but is instead collected diffusively as gas and vapor phase compounds reach the sorbent upon evaporating in zone A.

Techniques disclosed herein can improve extraction efficiency and matrix removal when performing sample preparation prior to GCMS analysis. Some embodiments of the disclosure use the volatile matrix to assist in the transfer of chemicals of interest from the sample to a sample extraction device 110. Multiple temperature zones during extraction can create and then eliminate a vapor flux in a closed system which can accelerate the transfer of chemicals to the sample collection device, while leaving behind the non-volatile compounds. Non-volatile chemicals can be eliminated more effectively than when using solvent extraction or when exposing an enrichment device directly to the sample matrix. Effective elimination of the non-volatile chemicals from the sample can help keep the GCMS analyzer clean so that the number of sample analyses can be maximized prior to analyzer maintenance. After the extraction of the volatile and semi-volatile compounds onto a sorbent included in the sample extraction device, the sorbent can either be solvent extracted for liquid injection into a GCMS or LCMS, or the sorbent can be thermally desorbed directly into the GCMS analyzer to improve the sensitivity of the analysis, for example. This improved sample extraction technique can be automated to allow hundreds of samples to be analyzed unattended in a laboratory.

MA-VASE described herein has advantages over the techniques described above, including for the preparation of samples including compounds boiling from −50° C. to about 550° C. The US EPA VOC methods for drinking and waste water analysis typically cover a boiling point range of about −25° C. to 220° C., so MA-VASE is an improvement on the current non-solvent based EPA methods, specifically for higher boiling point compounds There are currently over 600 compounds on the EPA's "Emerging Pollutants List", and many researchers are working on developing analytical methods for those compounds that are not amenable to extraction methods found in current EPA methods. MA- VASE has the potential to provide a superior sample preparation solution for a larger range of compounds than possible with any other technique.

Figure 1B:
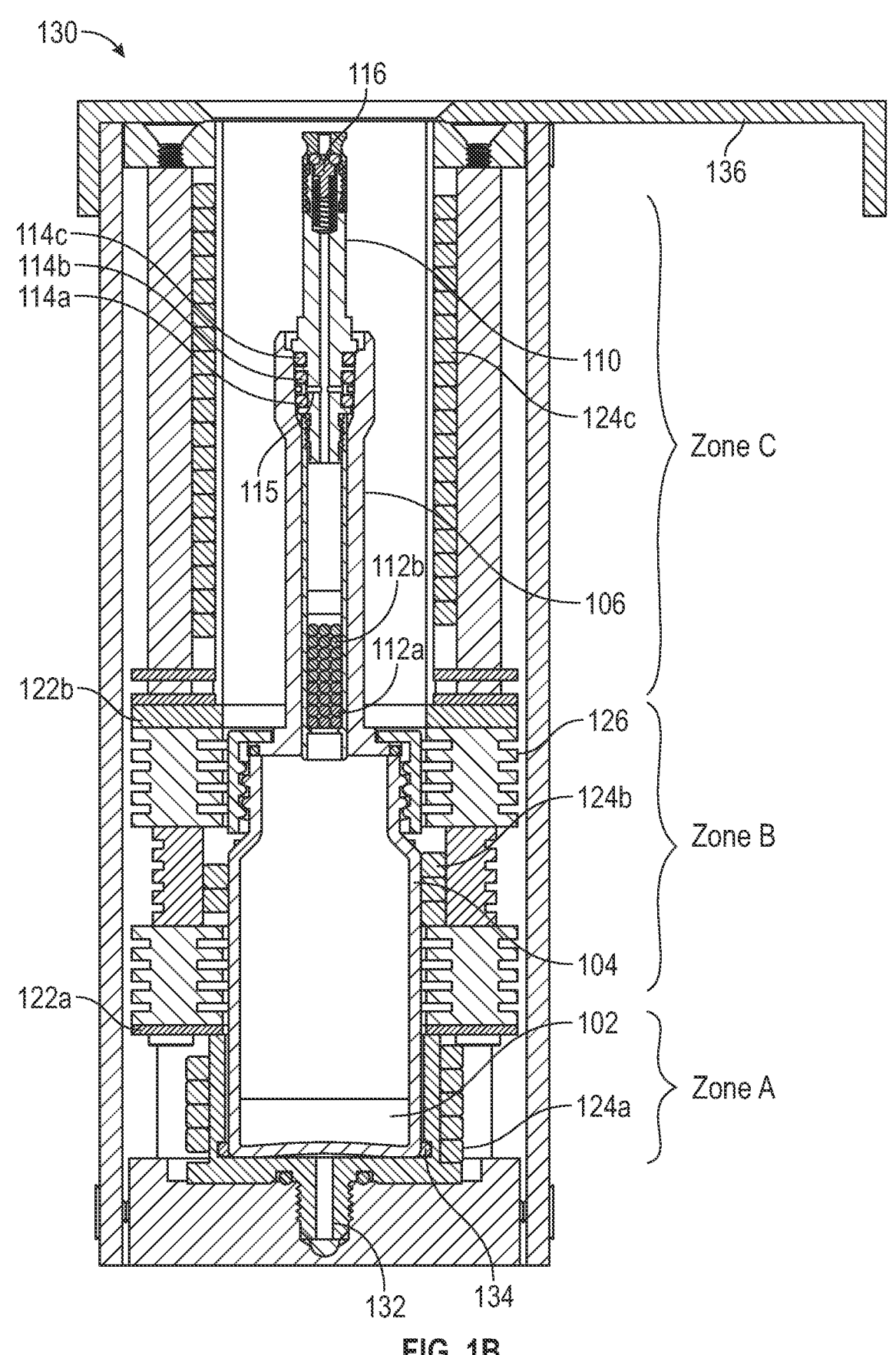

FIGS. 1A-1B illustrate exemplary sample extraction systems 100 and 130 according to some embodiments. In some embodiments, the sample extraction systems 100 and 130 can include one or more sample vials 104 containing a (e.g., liquid or solid) sample 102, one or more sample extraction devices 110, and a vacuum sleeve 106. In some embodiments, the sample extraction device(s) 110 can include one or more sorbents 112a and 112b, a plurality of external seals 114a-c, a port 115, and a valve 116.

In some embodiments, system 100 shown in FIG. 1A can include ten sample extraction devices 110 each coupled to a sample vial 104. For example, the view shown in FIG. 1A is one of five rows of two sample extraction device 110-sample vial 104 pairs. In some embodiments, extraction of ten samples can be performed concurrently (e.g., manually, fully or partially automated).

In some embodiments, system 130 can be used to extract one sample at a time. In some embodiments, system 130 can be used to re-use multiple (e.g., two) sample extraction devices 110 in an alternating manner to continuously perform sample extractions and analyses. For example, sample extraction can be performed for the same duration as sample analysis, so one sample can be extracted into a first sample extraction device 110 while another sample can be desorbed and analyzed from a second sample extraction device 110. Then, in this example, the sample extracted by the first sample extraction device 110 can be analyzed while the second sample extraction device 110 is re-used to extract another sample. In some embodiments, this process can be repeated hundreds or thousands of times or more with the same sample extraction devices 110. This process can be fully or partially automated (e.g., with an autosampler or other robot(s)), if desired. In addition to the components in common with system 100, system 130 can include a vacuum port 132 for sample extraction device 110 exchange, vacuum seal 134, and sliding cover 136.

In some embodiments, the sample extraction device 110 includes a single sorbent. In some embodiments, the sample extraction device 110 includes two or more sorbents 112a and 112b arranged with the sorbent(s) having the weakest affinity to one or more compounds of the sample closest to the opening of the sample extraction device 110 through which the one or more compounds of the sample enter the sample extraction device 110, with sorbents having stronger chemical affinities arranged further from the opening of the sample extraction device 110. For example, sorbent 112a can have a lower chemical affinity to one or more compounds of the sample than sorbent 112b. In this way, heavier compounds can be retained by weaker sorbents (e.g., sorbents with reduced chemical affinities for one or more sample compounds) closer to the opening of the sample extraction device 110 and lighter compounds that may require a higher surface area or otherwise stronger adsorbent in order to be adsorbed can pass through the weaker sorbent to be collected by the stronger sorbents. This approach can reduce the required temperature to release all compounds upon thermal desorption, which can reduce the reaction of thermally labile compounds and can improve the life time of the sorbent sampling device.

In some embodiments, the sample extraction device 110 can be coupled to the sample container 104 such that the outer surface of the sample extraction device 106 can (e.g., substantially) remain outside of the headspace of the sample container 104. In this way, for example, exterior surface(s)

of the sample extraction device 110 can remain uncontaminated by the one or more compounds of the sample.

In some embodiments, a sample 102 to be extracted can be placed into the sample container 104 (e.g., a sample vial), and the sample extraction device 110 can be placed at the top of the sample container 104. Assembling the system 100 or 130 in this way can create a vacuum-tight seal between the sample container 104, vacuum sleeve 106, and the sample extraction device 110, for example. A vacuum can then be applied to the system (e.g., using a vacuum source), either through the valve 116 or port 115 of the sample extraction device 110 or other means. In some embodiments, the vacuum source is a vacuum pump or other system that removes gas from a closed system. In some embodiments, drawing the vacuum does not "pull" the liquid or solid matrix through the sorbent 112a-b, but instead evacuates gases from the headspace of the sample container 104 to accelerate the diffusion rate of headspace compounds while also allowing the creation of a "matrix to headspace" vapor transport mechanism, described in more detail below. This vacuum can be substantial, and may be limited only to the vapor pressure of the volatile fraction of the matrix at the coolest part of the extraction system (for water, about $\frac{1}{30}^{th}$ of atmospheric pressure at 25° C.), for example. In some embodiments, the temperature of zone B ultimately controls the system vacuum. In some embodiments, sealing the sample extraction device 110 and sample container 104 (e.g., with vacuum sleeve 106) can create a closed system in sample extraction system 100 or 130 in which mass cannot enter or exit the system once the initial headspace compounds (e.g., air, nitrogen, other fixed gases) have been evacuated.

In some embodiments, three temperature zones are maintained during the extraction. These are listed as zones A, B, and C in FIGS. 1A-1B, for example. In some embodiments, the system can include insulation 122a and 122b between the temperature zones to prevent or reduce the direct influence of each heater on the temperature of an adjacent zone, to any great extent. Heaters 124a-c can be used to allow the temperature of each zone to be maintained, and some cooling control (e.g., heat sinks 126, fans, or electronically cooled systems) can be used to remove heat in zone B, such as heat produced by matrix condensation, as will be described. In some embodiments, heat can be transferred from zone A to zone B, such as due to the heat generated as water vapor condenses in zone B, for example. Therefore, effective cooling of zone B in some embodiments can be critical to control the temperature difference between zones A and B, which can in turn increase or maximize the vapor flux of the sample and increase or maximize extraction rates of the sample.

In some embodiments, creating temperature zones with different temperatures from one another can cause rapid vapor and condensate formation. In some embodiments, the speed with which vapor and condensate can form under the vacuum of system 100 or 130 can be much faster than rates that can occur at atmospheric pressure due to the higher mobility of gas phase molecules under a vacuum, for example. For example, the initial vacuum drawn in system 100 or 130 can allow for the creation of a positive vapor flux at relatively low temperatures, as will be detailed below.

In some embodiments, zone A can contain the (e.g., liquid and/or solid) sample to be extracted, although some of the sample may extend into zone B and, as the extraction process proceeds, one or more (e.g., volatile, semi-volatile) compounds of the sample are transferred to the sorbent 112a-b in zone C. Heating a liquid sample in A can cause it to expand (become less dense) and rise, creating a mixing process (e.g., without the use of a mechanical, magnetic, etc. stirring apparatus or agitator), for example. As the temperature of the liquid (e.g., or solid) sample increases, the temperature can get closer to boiling point of the liquid sample (e.g., or the boiling point of the liquid content within a solid sample, or the boiling point of a solid itself) and, in general, the vapor pressure above the (e.g., liquid or solid) sample 102, such as the vapor pressure in sample vial 104, can increase, for example. As used herein, the term "boiling point" is understood to be the temperature at which the vapor pressure of the volatile liquid fraction of the sample equals the vapor pressure of the headspace of the sample container, and as described previously, this temperature can be well under the standard boiling point temperatures of a volatile matrix at atmospheric pressure. For example, water can boil at 25° C. at a headspace pressure of 18 Torr, as compared to boiling at 100° C. at a headspace pressure of 760 Torr (standard atmospheric pressure).

As the heat in zone A causes the liquid to (e.g., partially) vaporize, chemicals within the sample can likewise be delivered into the gas phase, even at temperature/pressure combinations that are far below the boiling point of the compounds at atmospheric pressure. Because system 100 and 130 is a closed system, if the entire system 100 or 130 were brought to a single temperature, the pressure in system 100 or 130 could rise until an equilibrium was achieved for that particular temperature, after which no more net transfer of liquid into the gas phase would occur, for example. In this example, the resulting conditions would likely cause condensation of the matrix throughout the system 100 or 130. However, this is not the case when operating system 100 or 130 with three temperature zones, for example. In some embodiments, the three temperature zones of system 100 or 130 can cause continuous evaporation and condensation of sample 104 compounds, creating a mixing effect of the sample 104 in the system. Heating zone A from below can increase the temperature of the volatile matrix, which can thereby decrease its density and cause it to rise within the sample matrix to effect a mixing process to ensure compounds of interested are continuously presented to the surface for gas phase transport, for example.

In some embodiments, zone B can be insulated from zone A (e.g., by insulation 122a), and can be at a lower temperature than zone A. Therefore, as soon as the vapor expands into zone B, energy can be drawn away from the vapor phase molecules through collisions in the cooler zone (occurring faster due to higher diffusion rates under vacuum), and compounds can again coalesce into a liquid, as either aerosols or droplets on the surface of the sample container 104 in zone B, for example. The conversion of the gas back to a liquid can reduce the net flow rate to (e.g., substantially) zero, as the system is a closed system during the extraction process—which can allow aerosols to "settle" in zones A and B, rather than continue to move towards zone C, for example.

In some embodiments, once liberated into the gas phase, chemicals that are not as highly soluble in the matrix as the primary matrix compounds themselves (e.g., water) can tend to remain in the gas phase, as opposed to condensing into aerosols and droplets. This tendency can allow them to continue to diffuse so they can find one or more of the sorbents 112a and 112b in zone C where they will be collected (e.g., diffusively), for example. In some embodiments, zone C can be held at a temperature that is a little higher than the temperature of zone B, which can prevent or reduce collection of unwanted volatile matrix compounds (e.g., water, alcohol, etc.) in zone C. Thus, in some embodiments, the liquid matrix does not collect on the sorbent 112a-b during the sample extraction process. For example, in the case of a water matrix, the higher temperature of zone C can cause the relative humidity to be less than 100%. Moreover, in some embodiments, the one or more sorbents 112a-b can be chosen that will not absorb or adsorb the primary matrix compounds (e.g., typically and primarily aqueous or water/alcohol mixture). Even if an aerosol created by the recondensation of the matrix in zone B were to by chance make it to zone C, the zone C temperature can allow the aerosol to "evaporate" from zone C and redistribute to zone B because the energy level of each molecule in zone C can be made higher than the energy levels of compound s in zone B due to the temperature of zone C being higher than the temperature of zone B, for example.

During the condensation of the matrix in zone B, heat can be released as the vapor condenses (e.g., heat of vaporization), and the heat must be removed from zone B in order to maintain temperatures that are lower than zones A and C, and as close to a setpoint temperature as possible, for example. In some embodiments, the temperature in zone B can be maintained by reducing the temperature of zone A (e.g., therefore reducing the required condensation and heat transfer rate required by zone B) such that zone B liberates enough heat passively, or by providing heat transfer and/or heat removal mechanisms such as heat sinks 126 with heat transfer fins, by using air fans, or by using a recirculating cooling liquid around zone B. In general, the faster the refluxing process (e.g., the higher temperature zone A is relative to the temperature of zone B), the greater the amount of heat removal from zone B that will be necessary, for example, but faster refluxing can also increase the vapor flux and reduce the extraction time needed to substantially recover all compounds of interest.

As liquid vaporizes, there exists a transition layer at the liquid/vapor boundary where the composition goes from 100% liquid to 100% gas phase over a non-zero distance, for example. Thus, at some point in the transition zone, the matrix is 90% liquid and 10% gas, then 80% liquid and 20% gas, and so on, up to the point where the 100% gas phase is achieved, for example. Although on a macro scale this distance may be relatively small, this distance may not be small on a molecular scale. In the MA-VASE process disclosed herein, there can be a positive flow of gas towards the headspace of the sample container 104, so heavier compounds that may resist going into the headspace when using standard mechanical mixing can be "pushed" into the headspace by getting caught in this phase transition process and forced flow of the matrix. As the vapors recondense in the cooler zone B, like-molecules can preferentially condense with each other, and target compounds can be more likely to remain in the gas phase where they can continue to the sorbent(s) 112a-b. Aerosols can either settle back into the sample matrix (e.g., in zone A) directly, or can condense and "drain" back down into the sample 102 at the bottom of the sample container 104 under the influence of gravity. Once back in zone A, the evaporation and condensation of compounds can be repeated continuously to complete the extraction process. This vaporization/aerosolization approach can increase the surface area of the sample (e.g., without the use of a physical stirring or agitation apparatus). Other systems/ techniques that mix the sample at an isothermal temperature do not take advantage of a vapor flux in the direction of the sample extraction device 110, and can therefore obtain a slower extraction rate, due to the lack of the vapor flux.

Moreover, techniques that proceed at atmospheric pressure, rather than under vacuum, can also obtain a slower extraction rate.

The MA-VASE technique presented herein can solve several problems with other extraction techniques. For example, the sorbent(s) 112a-b can be placed close enough to the sample 102 to eliminate the use of transfer lines, but far enough away to avoid contact with the condensed matrix. In techniques that purge the sample through transfer lines, said use of transfer lines can cause compound reactions on the inner surfaces of the transfer lines, and can cause very heavy (yet partially volatile) compounds to permanently stick to those surfaces, which can create a film that can retain target compounds in future extraction events, thereby rendering the recovery of compounds inconsistent from run to run. Method consistency both from run to run and over an extended period of time (hundreds of samples) is important, yet is not achieved by most extraction techniques, especially those that use transfer lines between the sample and the extraction device, for example. MA-VASE can eliminate transfer lines by placing the sorbent(s) 112a-b at the top of the sample container 104, for example. Sample containers may only be used once and then discarded, eliminating the potential for carryover (contamination) due to running higher concentration samples as found in other extraction systems where parts of the extraction system are used multiple times.

In some embodiments, creating a dynamic flow out of zone A and a static diffusive flow in zone B (as most of the vapors recondense to eliminate the flow of vapor) allows target compounds to collect on the sorbent(s) 112a-b in zone C in a diffusive process with virtually no channeling into the sorbent, as the net flow in zone C is zero, at least relative to >99% of the sample (or 99.99+% of the sample for trace analysis). Channeling, whereby one or more compounds are pushed further into a sorbent than they would using a diffusive transfer technique, can be a problem with dynamic headspace systems (e.g., Purge and Trap, others). Reduction of channeling can improve recovery during thermal desorption of the sample extraction device 110, reduce the bakeout times needed to clean the sorbent(s) 112a-b (and thereby the amount of thermal stress to the sorbent itself), and reduce carryover of one or more compounds from one run to the next. Dynamic headspace techniques can have carryover typically in the 0.1-1% range (compound dependent), whereas static diffusive sampling techniques such as MA-VASE can show carryover levels well below 0.01% (e.g., due to reduced channeling).

MA-VASE can also eliminate the need for mechanical mixing. Many SPME systems, for example, use high speed agitators to improve recovery of heavier target compounds. Mechanical mixing can continually refresh the boundary layer to increase the rate of transmission to the headspace. Relatively slow agitation rates can refresh the top surface of the sample, yet most SPME methods that use mechanical mixing show an improvement in recovery when mixing is at high rates, the higher the better, for example. The increase in recovery is higher than the effect of increasing the size of the meniscus when mixing at high speeds rather than lower speeds. In reality, high speed mixing can cause the liquid matrix to be "splashed" or "thrown" into the headspace, which can deliver full droplets of the sample matrix itself to the SPME fibers, which differs from the desired "clean" headspace approach where only gas phase molecules are allowed to reach the fiber. This aerosol transfer can increase low vapor pressure target compound recovery, but at the expense of also transferring non-volatile compounds, including salts, proteins, carbohydrates, etc., to the fiber, which can reduce the lifetime of the fiber and can result in the creation of artifacts during analysis. MA-VASE's vaporization of the liquid (e.g., or solid) sample 102 at temperatures below the boiling point of the sample 102 can produce little to no aerosols directly from the sample 102, for example. In some embodiments, the only aerosols generated in the MA-VASE approach are those that form in the condensation zone B. These condensation aerosols can include only volatile and semi-volatile compounds, as the non-volatile compounds do not vaporize, for example. The matrix acceleration (vapor flux) can be adjusted by modifying the temperatures of zones A and B, which can allow increased or maximum recovery of compounds of interest while rejecting the heavier, non-GC compatible compounds that may not go into the gas phase. Therefore, MA-VASE can be a superior way to transfer volatile and semi-volatile compounds from the sample 102 to the sorbent(s) 112a-b, by creating then eliminating a flux of the matrix itself to propel target compounds into the gas phase, instead of using mechanical agitation which can create too much splashing of the sample within the sample container 104.

During extraction, zone A can either be kept at some constant temperature that is typically higher than the zone B temperature, or it can be ramped and decreased in a cyclic process. In some embodiments, zone A can remain at a higher temperature than zone B even if the temperature in zone A periodically fluctuates. In some embodiments, the temperature of zone A can periodically fluctuate between being greater than the temperature of zone B and being less than the temperature of zone B. Periodically modifying the zone A temperature may increase the vapor flux density relative to maintaining zone A at a fixed temperature during the extraction process. Rate of temperature increase can be evaluated for different applications and sample types to determine the rate and amount of change of temperature in zone A that achieves the fastest extraction while providing the least amount of matrix transfer to the sample extraction device 110. For example, a method can be developed to reduce or minimize the amount of water transferred to the sample extraction device 110.

In some cases, at one or more times during the extraction process, zone A can be brought to a temperature that is lower than zone B or C, and zone B can be heated to a higher temperature than zones A and C. These temperatures may release any heavier compounds of interest that were stuck on the sample container 104 walls in zone B, allowing them to re-volatilize and enter the sorb ent(s) 112a-b once zone A is heated again. In some embodiments, the heavier compounds of interest may instead partition to both zones A and C. In these situations, the compounds that transferred back to zone A can transfer to zone C by once again heating zone A to the highest temperature of the three zones, and bringing the temperature of zone B back to a temperature lower than both zones A and C, such that the extraction from zone A to zone C can continue. In this way, for example, the recovery of heavy GC-compatible compounds can be increased or maximized.

In some situations, the temperature of zone B can be temporarily (e.g., periodically) raised to the temperature of zone A, while the temperature of zone C is slightly above those of zones A and B in order to release heavy compounds that collected in zone B. This technique can ensure that nearly a 100% humidity condition at an elevated temperature in zone B can be used to help release the heaviest compounds from the inner walls of the sample container in zone B to again have a chance to diffuse to zone C.

In some embodiments, when processing samples that may be thermally labile, zone B can be cooled to a sub-ambient temperature so that zone A can remain at (e.g., substantially) room temperature (e.g., 25-40° C.) during the extraction process. In some embodiments, when preparing a sample of natural products, the temperature of zone A can be 25-40° C., avoiding temperatures above 40° C. that could "cook" the natural products. With zone A at a temperature in this range, for example, to achieve desired flux, zone B can be at a temperature in the range of 0–10° C. and zone C can be at a temperature 30° C. or higher. For some samples, the non-volatile fraction in the natural products may "cook" and create artifacts at temperatures as low as 40° C., but the volatile fraction can be subjected to higher temperatures in zone C without creating artifacts. In some embodiments, the temperature of zone C is lower than zone A. In some embodiments, the temperature of zone C is greater than or equal to zone A.

In some embodiments, prior to the extraction of one or more volatile and/or semi-volatile compounds of a (e.g., solid) sample, a volatile matrix (e.g., water and/or alcohol) can be added to the sample. In some embodiments, this volatile matrix can help the volatile and/or semi-volatile compounds of the (e.g., solid) sample transfer to the gas phase. For example, soil samples may allow the release of their volatile and semi-volatile content when water and/or alcohol are added, followed by MA-VASE extraction. In this case, the initial temperatures of zones A, B, and C can all be higher than the temperatures during the remainder of the extraction process in order to heat the solid sample high enough in the liquid matrix to effect an extraction of compounds of interest otherwise locked within the solid sample matrix, for example. In some embodiments, after a short solid to liquid extraction, the temperatures of zones A, B, and C can be reduced to normal MA-VASE extraction temperatures, which can ensure that the temperature of the sorbent(s) 112a-b in zone C is cool enough to achieve the higher affinity for the potentially wide boiling point range of the compounds of interest. During pre-extraction, zone B is at a lower temperature than zones A and C, for example.

After the extraction period (5 min to 24 hours, depending on the matrix and compounds to be measured, but typically 0.2 to 4 hours), all zones can be cooled down, while maintaining the zone C temperature a little above the temperatures of zones A and B to prevent any condensation of the matrix in zone C during cool down. During this time, in some embodiments, volatile matrix can be further removed from the sample extraction device 110 in Zone C, as the system is still under vacuum, allowing any water or volatile matrix to quickly find the cooler parts of the system (e.g., zones A and B), achieving the ultimate goal of minimizing the amount of the volatile matrix that remains on or within sample extraction device 110. When the extraction process has completed, the sample extraction device 110 can be removed from the assembly (e.g., sample container 104, vacuum sleeve 106), and can be thermally desorbed into a GCMS using one of many different thermal desorption systems.

Figure 2:
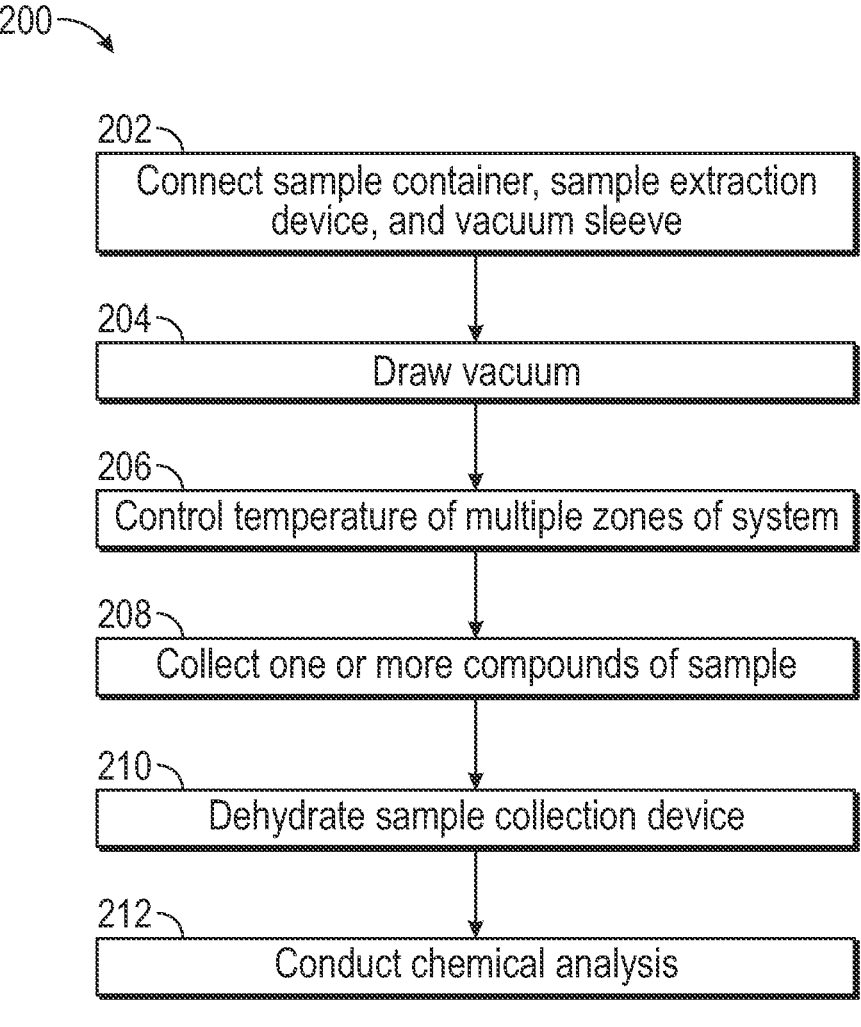
FIG. 2 illustrates an exemplary method of preparing a sample according to some embodiments of the disclosure.

FIG. 2 illustrates an exemplary method 200 of preparing a sample according to some embodiments of the disclosure. In some embodiments, system 100 or 130 described above with reference to FIGS. 1A-1B can be used to perform method 200. In some embodiments, one or more steps of the method 200 can be automated by one or more processors storing instructions (e.g., in a non-transitory computer-readable storage medium) for executing the method.

In some embodiments, the sample container 104, sample extraction device 110, and vacuum sleeve 106 can be connected together, forming a closed system. The sample container 104 can contain a (e.g., liquid or solid sample) when the sample container 104 is connected to the sample extraction device 110 and vacuum sleeve 106. In some embodiments, connecting the sample container 104, sample extraction device 110, and vacuum sleeve 106 can form a vacuum-tight seal in system 100 or 130. In some embodiments, the sample container 104, sample extraction device 110, and vacuum sleeve 106 can be placed in a three-zone heater as shown in FIGS. 1A-1B, so that the temperatures of zones A, B, and C can be controlled (e.g., substantially) independently of one another.

In some embodiments, a vacuum 204 can be drawn on system 100 or 130. In some embodiments, the vacuum can be drawn using a vacuum source, such as a vacuum source configured to remove gas from a closed system. For example, the vacuum can be drawn through the top valve 116 or side port 115 of the sample extraction device 110. In some embodiments, the vacuum can be drawn in a different manner. In some embodiments, the vacuum-tight seal between the sample container 104, sample extraction device 110, and vacuum sleeve 106 can maintain the vacuum in the system during preparation of the sample.

In some embodiments, the temperatures of multiple zones of the system 100 or 130 can be controlled 206 (e.g., substantially) independently from one another during process 200 using one or more heaters (e.g., heaters 124a-c), heat sinks (e.g., heat sinks 126), and/or other heating and/or cooling systems. For example, zone B can be held at a temperature that is lower than the temperatures of zone A and zone C, and zone C can be at a lower temperature than zone A. In some embodiments, insulation 122a and 122b and heat sinks 126 can help isolate the temperatures of zones A, B, and C from one another. In some embodiments, the temperature of zone A can be constant or can change periodically during process 200.

In some embodiments, process 200 can collect 208 one or more compounds of the sample in sorbent(s) 112a-b. For example, one or more volatile or semi-volatile compounds of the (e.g., liquid, solid) sample 102 can evaporate from zone A to zone B and, once in the vapor phase, can be collected by sorbent(s) 112a-b. In some embodiments, the sorbent(s) 112a-b can be selected to reject compounds of the matrix. For example, hydrophobic sorbents can be used to reject water from a water sample. Moreover, because the temperature of zone B can be less than the temperature of zone C, one or more compounds of the matrix that reach sorbent(s) 112a-b can evaporate from the sorbent(s) 112a-b and transfer back into the sample container 104.

In some embodiments, process 200 can include dehydrating 210 the (e.g., sorbent(s) 112a-b included in the) sample collection device 106, such as by cooling zones A and B to temperatures (e.g., slightly) lower than the temperature in zone C. Dehydrating the sample collection device 106 in this way can remove matrix from sorbent(s) 112a-b.

In some embodiments, process 200 can include conducting 212 chemical analysis (e.g., by GC or GC-MS) on the compounds collected by the sorbent(s) 112a-b. In some embodiments, prior to analysis, the one or more compounds retained by sorbent(s) 112a-b of the sample extraction device 110 can be thermally desorbed or extracted (e.g., using a solvent) from the sorbent(s) 112a-b.

In some embodiments, one or more techniques disclosed herein can be (e.g., fully, partially) automated. For example, a plurality of sample container 104, sample extraction device 110, and vacuum sleeve 106 assemblies can be disposed in a sample tray with which heaters 124*a*, 124*b*, and 124*c*, heat sink 126, and insulation 122*a* and 122*b* are integrated, allowing the preparation of multiple samples to be carried out simultaneously. In some embodiments, an autosampler can manipulate a vacuum pump to pull a vacuum in all of the assemblies and the temperatures of zones A, B, and C can be controlled via computer to perform an automated preparation of multiple samples at once. In some embodiments, an autosampler can then transfer the sample extraction devices 110 (e.g., one by one) to a system for desorbing or extracting and then analyzing the compounds retained by sorbent(s) 112*a-b*. Thus, in some embodiments, a computer controlling the sample preparation process can include memory storing instructions (e.g., via a non-transitory computer-readable medium) for executing one or more steps of one or more processes disclosed herein.

In some embodiments, after analysis of the sample(s) is complete, the sample container(s) 104, vacuum sleeve(s) 106, and sample extraction device(s) 110 can be baked out or cleaned according to one or more other methods and re-used.

Techniques disclosed herein can be used to improve the rate and quality of sample preparation prior to GCMS analysis. Virtually every field that uses GCMS can benefit from these techniques, including:

Petrochemical (plastics, synthetics)

Environmental (drinking water, waste water, soil, sludge)

Clinical (blood plasma, urine, breath condensate, lymphatic fluid, tissue analysis, metabolomics)

Foods and Beverages (flavors, off-flavor compounds, contaminants, regulated compounds)

Alcoholic Beverages (beer, wine, spirits)

Consumer Products (fragrances, odors, regulated contaminants)

Forensics (drugs of abuse, accelerants)

Military (chemical warfare agents)

Some embodiments of the disclosure support both manual or multi-sample, automated analysis. As with other analytical methods, recovery compounds can be added to each sample prior to extraction to verify that sample preparation occurred properly.

Therefore, according to the above, some embodiments of the disclosure are directed to a closed system for preparing a sample under vacuum, the system comprising: a sample container configured to hold the sample; a sorbent; a first heater configured to apply a first temperature to a first portion of the sample container; a second heater configured to apply a second temperature that is less than the first temperature to a second portion of the sample container; and a third heater configured to apply a third temperature that is greater than the second temperature to the sorbent. Additionally or alternatively, in some embodiments, the system further includes a vacuum sleeve configured to form a vacuum-tight seal between the sample container and a sample extraction device containing the sorbent. Additionally or alternatively, in some embodiments, the sample extraction device includes a port or a seal configured to be coupled to a vacuum source while a vacuum is being pulled in the system. Additionally or alternatively, in some embodiments, the sorbent is disposed in a sample extraction device, the sample extraction device configured to be removed from the system for analysis of one or more compounds of the sample. Additionally or alternatively, in some embodiments, the system further includes one or more heat sinks, fans, or sub-ambient cooling devices configured to maintain the second temperature. Additionally or alternatively, in some embodiments, the first heater is further configured to periodically modify the first temperature. Additionally or alternatively, in some embodiments, the system does not include transfer lines between the sample container and the sorbent. Additionally or alternatively, in some embodiments, the system does not include a physical stirring apparatus. Additionally or alternatively, in some embodiments, the sorbent is configured to collect one or more compounds of the sample and repel a matrix of the sample.

Some embodiments are directed to a method of preparing a sample in a closed system under vacuum, the method comprising: at the system, the system comprising a sample container, a sorbent, a first heater, a second heater, and a third heater, while the sample is disposed in the sample container: applying, with the first heater, a first temperature to a first portion of the sample container; applying, with the second heater, a second temperature that is less than the first temperature to a second portion of the sample container; and applying, with the third heater, a third temperature that is greater than the second temperature to the sorbent. Additionally or alternatively, in some embodiments, the method further includes drawing, via a vacuum pump, a vacuum in the system; and after drawing the vacuum, maintaining the vacuum in the system, wherein the first, second, and third temperatures are applied while the vacuum is maintained in the system. Additionally or alternatively, in some embodiments, the vacuum is drawn through a port or a seal of sample extraction device including the sorbent. Additionally or alternatively, in some embodiments, the method further includes maintaining the second temperature via one or more heat sinks, fans, or sub-ambient cooling devices. Additionally or alternatively, in some embodiments, the method further includes periodically modifying the first temperature with the first heater. Additionally or alternatively, in some embodiments, the method further includes collecting, via the sorbent, one or more compounds of the sample; and repelling, via the sorbent, a matrix of the sample. Additionally or alternatively, in some embodiments, the method further includes after collecting the one or more compounds of the sample: removing a sample extraction device that includes the sorbent from the system; and analyzing the one or more compounds of the sample.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A closed system for preparing a sample under vacuum, the system comprising:

a sample container configured to hold the sample, wherein a bottom of the sample container is positioned within a zone A and a headspace of the sample container is positioned within a zone B;

a sorbent positioned within a zone C, wherein the zone C is positioned in an area of the closed system that does not overlap zone A and/or zone B, wherein the sorbent is configured to extract the sample from a vapor of a matrix of the sample;

a first heater disposed in zone A;

a computer temperature control system configured to induce boiling of the matrix of the sample by controlling the first heater and applying a first temperature to a first portion of the sample container at the zone A, wherein the computer temperature control system comprises at least one or more heat sinks, fans, or electronic cooling systems configured to maintain a second temperature within a zone B between the zone A and a zone C, the zone B including a second portion of the sample container, via a combination of the computer temperature control system and condensation of the matrix of the sample in the zone B, wherein the second temperature is less than the first temperature;

a second heater disposed in zone C; and wherein the computer temperature control system is additionally configured to prevent the condensation and sustain the vapor of the matrix of the sample by controlling the second heater and applying a third temperature at the zone C, that is greater than the second temperature, to the sorbent; and a vacuum-tight seal formed between the sample container, a vacuum sleeve, and a sample extraction device, creating a closed system in which mass cannot enter or exit the closed system once initial headspace compounds have been evacuated.

2. The system of claim 1, wherein the sorbent is disposed in a sample extraction device, the sample extraction device configured to be removed from the system for analysis of one or more compounds of the sample.

3. The system of claim 1, wherein the computer temperature control system is further configured to control the first heater to periodically modify the first temperature.

4. The system of claim 1, wherein the system does not include transfer lines between the sample container and the sorbent.

5. The system of claim 1, wherein the system does not include a physical stirring apparatus.

6. The system of claim 1, wherein the sorbent is configured to collect one or more compounds of the sample and repel a matrix of the sample.

7. The system of claim 1, wherein the sample extraction device contains the sorbent.

8. The system of claim 7, wherein the sample extraction device includes a port or a seal configured to be coupled to a vacuum source while a vacuum is being pulled in the system.

9. A method of preparing a sample in a closed system under vacuum, the method comprising:

at the closed system, the system comprising a sample container, a sorbent positioned within a zone C, wherein the sorbent is configured to extract the sample from a vapor of a matrix of the sample, a computer temperature control system, while the sample is disposed in the sample container and a bottom of the sample container is positioned within a zone A and a headspace of the sample container is positioned within a zone B, a first heater positioned in the zone A, and a second heater positioned in the zone C:

controlling the first heater, with the computer temperature control system, a first temperature to a first portion of the sample container to include boiling of the matrix of the sample at the zone A;

maintaining, with the computer temperature control system, a second temperature within a zone B between the zone A and the zone C, the zone B including a second portion of the sample container, via a combination of the computer temperature control system and condensation of the matrix of the sample in the zone B, wherein the computer temperature control system comprises one or more heat sinks, fans, or electronic cooling systems, wherein the second temperature is less than the first temperature; and controlling the second heater, with the computer temperature control system, a third temperature that is greater than the second temperature to the sorbent at the zone C such that the vapor of the matrix of the sample is sustained in zone C, the zone C being above the zone A and the zone B and does not overlap zone A and/or zone B; and forming a vacuum-tight seal between the sample container, a vacuum sleeve, and a sample extraction device, creating a closed system in which mass cannot enter or exit the closed system once initial headspace compounds have been evacuated.

10. The method of claim 9, further comprising:

drawing, via a vacuum pump, a vacuum in the system; and after drawing the vacuum, maintaining the vacuum in the system, wherein the first, second, and third temperatures are applied while the vacuum is maintained in the system.

11. The method of claim 10, wherein the vacuum is drawn through a port or a seal of the sample extraction device including the sorbent.

12. The method of claim 9, further comprising:

periodically modifying the first temperature with the computer temperature control system.

13. The method of claim 9, further comprising:

collecting, via the sorbent, one or more compounds of the sample; and repelling, via the sorbent, a matrix of the sample.

14. The method of claim 13, further comprising:

after collecting the one or more compounds of the sample:

removing a sample extraction device that includes the sorbent from the system; and analyzing the one or more compounds of the sample.

* * * * *